Feb. 3, 1959   S. B. JONES   2,872,638
OCEAN BOTTOM STRATIGRAPHY SURVEYING
Filed March 31, 1955
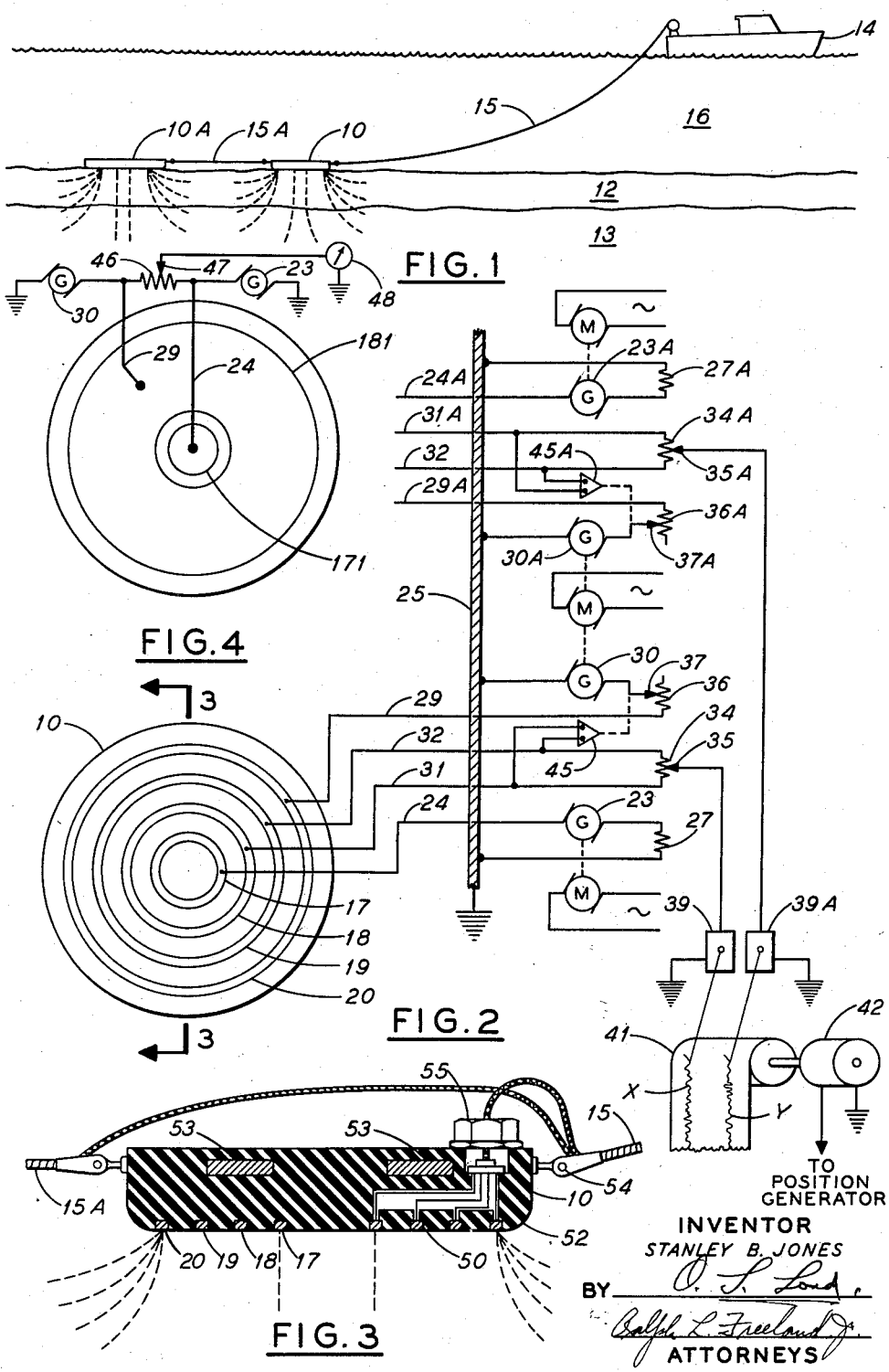
INVENTOR
STANLEY B. JONES

United States Patent Office 2,872,638
Patented Feb. 3, 1959

2,872,638

OCEAN BOTTOM STRATIGRAPHY SURVEYING

Stanley B. Jones, Whittier, Calif., assignor to California Research Corporation, San Francisco, Calif., a corporation of Delaware Application March 31, 1955, Serial No. 498,309

4 Claims. (Cl. 324—1)

This invention relates to a method of and apparatus for investigating the sediments of an underwater bottom, more particularly to a method of reconnaissance surveying of underwater sediments by measuring an electrical characteristic of the sediments, and has, for an object, the provision of a method for continuously traversing a path along the surface of the underwater bottom with a plurality of electrodes, spaced a predeterminable distance apart and insulated from each other and from the overlying water, while simultaneously passing an electrical current from at least one of the electrodes through the bottom sediments and measuring the change in an electrical quantity through another of the electrodes as affected by the sediments to determine a physical characteristic of the underwater bottom sediments.

In the investigation of sediments, or earth structures lying along an underwater bottom, it has heretofore been common practice to sample mechanically, e. g., by coring, or scooping the rocks and surface sediments at individual points. Alternatively, underwater sediments have been investigated by use of seismic techniques which include exploding a charge of dynamite or black powder and then measuring the time interval required for seismic reflections to return to a set of detectors which have been positioned a predetermined distance from the explosion.

Both of the foregoing methods have the limitation that only individual or isolated points along a traverse or path through the underwater bottom can be investigated by these methods. Such individual measurements, of course, limit the area which can be covered rapidly, with expenditure of a minimum amount of manpower and equipment. Accordingly, for rapid reconnaissance surveying of extended areas, neither of these methods is economically attractive.

Magnetic surveying methods have been practiced by trailing a magnetometer to measure magnetic field variations from either an airplane or a boat. However, such measurements are primarily intended to locate extended regions of sedimentary rocks rather than for the purpose of detailed investigation of the structure of the sedimentary rocks within such regions.

In accordance with the present invention, there is provided a method of investigating the sediments lying along the bottom of a body of water by traversing said bottom sediments with an electrode system arranged to cause an electrical current to be focussed thereinto to permit continuous plotting of the change in a measured electrical quantity, such as electrical potential, as that quantity is affected by variations in a physical characteristic of the sediments traversed, such as changes in bottom stratigraphy below the surface sediments.

In accordance with a preferred method of carrying out the invention, a plurality of electrodes, positioned a predeterminable distance apart and insulated both laterally and vertically from each other and from the surrounding water, are traversed over the bottom surface of the strata lying beneath the body of water while an electrical current is passed downwardly into and through the earth strata by at least one of the electrodes to develop an electrical potential between the underlying sediments and another of the electrodes, so that a continuously varying potential, characteristic of changes in the true resistivity of the sediments traversed and the bottom stratigraphy, may be measured and recorded in accordance with the position of the electrode system on bottom.

In a preferred form of apparatus for carrying out the invention, a plurality of ring electrodes are concentrically positioned for contact with the underwater bottom. Each of the rings is insulated from the adjacent rings and from the water overlying the electrodes to permit focusing of the current flow path deeply into the underwater strata.

Further objects and advantages of the present invention will become apparent from the following detailed description taken in conjunction with the accompanying drawings which form an integral part of the present specification.

In the drawings:

Fig. 1 is a schematic representation of a preferred form of apparatus for practicing the method of the invention, particularly illustrating the method of traversing the underwater earth strata with an electrical measuring system constructed in accordance with the invention.

Fig. 2 is a schematic representation of a preferred form of electrical circuit utilized in continuously measuring and recording variations in the underwater bottom stratigraphy.

Fig. 3 is a cross-sectional, elevation view through the electrode asembly, as taken in the direction of arrows 3—3 in Fig. 2, which further illustrate the physical structure of the electrode assembly, and Fig. 4 is a bottom plan view of a modified form of electrode system which may be utilized in carrying out the method of the invention.

Referring now to the drawings and, in particular, Fig. 1, there is schematically illustrated a system for carrying out the method of the present invention, wherein an electrode supporting assembly 10 is adapted to direct an electrical current downwardly into the strata or sediments 12 and 13. As shown, assembly 10 is traversed continuously along the bottom by boat 14 which is arranged to pull assembly 10 by means of cable 15 and which, likewise, carries the input and output leads for the electrical circuit to and from the boat. As further shown, a second electrode assembly, identified as 10A, supporting a second and similar array of electrodes, may be drawn by an additional section of cable 15A connected to trail behind main electrode assembly 10. The purpose and method of operation of assembly 10A will be described more fully hereinafter but, in general, assembly 10A performs a measuring function similar to that of the electrode assembly 10 to be described immediately hereinafter.

With reference to Fig. 2, it will be noted that electrode support assembly 10 is preferably circular in configuration, and has disposed on the bottom engaging portion thereof, a plurality of ring electrodes identified as 17, 18, 19 and 20, each of which is concentric with respect to the others and assembly support 10. At least one of the electrodes, such as center electrode 17 in the present embodiment, is supplied with an electrical current which is maintained substantially constant by generator 23 and lead 24 within towing cable 15. Generator 23 is likewise remotely coupled to a return or ground connection, such as the water body through metal hull 25 of boat 14. This return connection, of course, operates through the entire body of water 16, as well as through sediments 12 and 13 to complete the current flow path. As indicated schematically, the output of generator 23 is maintained as nearly constant as possible through any suitable load control device, such as resistor 27. In general, resistor 27 has a relatively large value, e. g., 1000 ohms, compared to the resistance of the entire flow path from electrode 17 to hull 25, which may have a value of about 10 ohms.

In accordance with the present invention, the output current from generator 23 and electrode 17 is focused deeply into strata 12 and 13 by another concentric electrode, such as outer ring electrode 20. To this end, electrode 20 is supplied by another source of current, such as generator 30 which is independent of the first-mentioned current source. Thus, ring 20 has applied thereto, through line 29, a current whose flow path is as generally indicated and whose value is controlled to focus the current supplied to electrode 17 by generator 23 downwardly through the upper sediments and into the deeper strata. Variations in the physical or structural characteristics of strata 12, 13, as reflected by variations in an electrical characteristic, such as resistance or impedance, is then detected by measuring the potential of an intermediate electrode system, such as concentric rings 18 and 19. In the embodiment of Fig. 2, electrodes 18 and 19 are connected in series through lines 31 and 32 with a potential measuring resistance 34. Connection between the potential measuring resistance 34 and recording galvanometer 39 is provided through an adjustable center tap 35. The purpose of this type of connection is to permit compensation for the difference in contact resistance between the underwater bottom and the two electrodes 18 and 19. Likewise, variations in potential between electrodes 18 and 19 are not included in the potential measurement between tap 35 and ground. As shown, galvanometer 39 is arranged to record the potential measured by electrodes 18 and 19 as curve X on chart 41. Chart 41 is, of course, driven in synchronism with the boat's position by motor 42.

In a preferred manner of operating the current sources 23 and 30 and the electrode system shown in Fig. 3, the current applied by generator 30 and line 29 to outer electrode 20 is continuously adjusted by servo amplifier 45 which, as shown, controls tap 37 on resistor 36 to maintain the potential difference across resistor 34 equal to substantially zero. Thus, with a predetermined and substantially constant current being focused from electrode 17 into the formation, the potential measured by electrodes 18 and 19 will vary directly with variations in the resistance or impedance of the formations.

The electrode system, including potential measuring rings 18, 19, and focusing electrode 20 illustrated in Fig. 2, may be combined, as in the alternative embodiment of the invention shown in Fig. 4. As schematically indicated, a single annular focusing electrode, identified as 181, is connected to focusing current generator 30 while a central or inner disk 171 provides an input electrode from which focused current, supplied by generator 23 is directed deeply into strata 12 and 13. In this embodiment, the potential representing a physical characteristic of the strata, is measured by meter 48 which is connected to potential measuring resistor 46 through center tap 47. Center tap 47 is desirably adjusted to represent the potential intermediate inner electrode 171 and focusing electrode 181.

As indicated in Fig. 2, stub connecting lines 24A, 29A, 31A, 32A, provide similar connections to another set of electrodes supported by sled structure 10A. As shown schematically in Fig. 2, the output signal from electrode assembly 10A is recorded as curve Y on chart 41 by galvanometer 39A. Briefly, as contemplated by the present invention, the curve Y represents an electrical characteristic similar to that recorded by curve X, but with the exception that the spacing between the ring electrodes in assembly 10A will be either several times larger or smaller than those in assembly 10. In this manner, the thickness of the near surface strata, and the contributions of the deeper formation to the measured electrical characteristic may be better evaluated.

There is illustrated in Fig. 3 a preferred form of apparatus for carrying out the method described in connection with Figs. 1 and 2. As there shown, the electrodes 17, 18, 19, and 20 are desirably embedded in a circular insulating electrode support or assembly indicated as 10. The support assembly 10 is preferably formed of an insulating hard rubber material with copper electrodes molded therein or recessed in concentric grooves 50. As further shown, the outer edges 52 of the bottom engaging portion of assembly 10 are provided with a suitable radius of curvature to assist the towing of sled assembly 10 over the bottom. Weights 53 are provided in sled 10 to assist in maintaining the assembly in firm engagement with the bottom, as illustrated. A towing lug, identified generally as 54, is provided for mechanical coupling assembly 10 to the tow cable 15. The electrical connection between leads 24, 29, 31, and 32 and their corresponding electrodes are provided by terminal block 55 in the upper portion of assembly 10.

In operation of the electrical reconnaissance surveying apparatus, boat 14 is steered along a predetermined path with the assemblies 10, and if desired, 10A, being towed along the underwater bottom by the cables 15 and 15A. Desirably, as mentioned above, the two assemblies 10 and 10A are constructed with spacings between the ring electrodes in assembly 10A being some multiple of the spacings between electrodes 17, 18, 19, and 20 of assembly 10. The purpose of building electrode assemblies 10 and 10A with different spacings is to provide different depths of penetration of the electrical current from electrode 17. By focusing of the input current to a greater and lesser degree through the normally low-resistance surface sediments, indicated as 12, there is obtained not only a greater knowledge of the resistance, and, in turn, the physical characteristics, of the lower sediments 13, but also a measure of the thickness of the near-surface sediments.

Where strata 12 has a very low resistance value, the spacing of the electrodes in assembly 10A will be greater than those of assembly 10. However, where higher resistance values of the surface sediments are encountered, shorter spacings between electrodes in sled 10A may be used than in unit 10. Thus, different depths of investigation or penetration will be represented by curves X and Y on recording chart 41. By the use of departure curves based upon resistance of the sediment samples in contact with the electrodes, there may be developed from the potential, and in turn the resistance, measurements a more complete knowledge of the physical characteristics of the underlying strata or beds, such as 13. It will, of course, be understood that a single traverse of an area by one electrode assembly may be employed for rapid reconnaissance, in preference to the dual traversing of the same area described above.

As indicated above, in connection with Fig. 2, the focused output current flowing from innermost electrode 17 is maintained substantially constant, while the potential between electrodes 18 and 19 and infinity is measured. Alternatively, as shown in Fig. 4, the potential between the electrical equivalent of a point intermediate to the electrodes 171 and 181 and infinity may be measured to investigate the physical characteristics of the earth strata or sediments. These measurements may then be recorded by galvanometer 39 in accordance with the location of the electrode system along the underwater bottom. As thus employed, galvanometer 39 measures potential. However, galvanometer 39 may be connected to measure variations in the conductivity of the sediments in circuit with current supplied by electrodes 17 or 171 in other types of circuits in which said electrodes do not emit constant current. To this end, variations in the current flow through electrodes 17 or 171 are measured and recorded, by connecting galvanometer 39 as an ammeter in circuit therewith.

While various other modifications and changes in the method and apparatus described hereinabove will become apparent to those skilled in the art, all such modifications and changes falling within the scope of the appended claims are intended to be included therein.

I claim:

1. A method of exploring the stratigraphic structure of an underwater bottom which comprises the steps of positioning an array of radially displaced electrodes on said underwater bottom, applying an electrical potential between at least one of said electrodes and the body of water overlying said bottom, and applying another electrical potential to another of said electrodes displaced radially outward from said one electrode and said body of water to focus an electrical current downwardly into the underwater sediments, continuously traversing a predetermined course along said bottom with said electrode array, and continuously recording the changes in a measured electrical quantity due to variations in the electrical and physical characteristics of the sediments traversed, said recording being made in accordance with the position of said electrode array on said underwater bottom.

2. A method of investigating the physical character of sediments along an underwater bottom of a body of water which comprises the steps of positioning a plurality of radially displaced electrodes a predeterminable distance apart to form at least central and outer electrodes, insulating said electrodes laterally from each other and vertically from the body of water, traversing a predetermined course along said bottom with said plurality of electrodes, applying an electrical potential between said central electrode in contact with said sediments and said body of water, applying another electrical potential between said outer electrode and said body of water, measuring the changes in an electrical quantity representing a structural characteristic of the underwater sediments by measuring the changes in electrical potential detected between said central and said outer electrodes and said sediments, and continuously recording said potential changes in accordance with the position of said plurality of electrodes along said predetermined course.

3. A method of investigating the physical characteristics of sediments lying along the bottom of a body of water which comprises the steps of positioning a first plurality of circularly disposed electrodes in engagement with the bottom, positioning a second plurality of circularly disposed electrodes in engagement with the bottom a predetermined distance from said first plurality of electrodes, the radial spacing between the electrodes of said second plurality of electrodes being a multiple of the radial spacing between the electrodes of said first plurality of electrodes, towing said first and second plurality of electrodes along a predetermined course over the bottom sediments, applying an electrical potential between at least the central electrode in each of said first and second plurality of electrodes contacting the sediments and said body of water, regulating said potential to maintain current flow through said central electrode at substantially a constant value, applying another electrical potential to an outer electrode in each of said first and second plurality of electrodes to focus the current flow from said central electrode into the sediments, measuring the potential changes between said body of water and at least a third electrode positioned intermediate said central and outer electrodes in each of said first and second plurality of electrodes when said electrodes are towed over the bottom sediment and continuously recording the potential changes detected by each of said intermediate electrodes in said first and second plurality of electrodes in accordance with the position of each of said plurality of electrodes along said predetermined course.

4. Apparatus for detecting changes in physical characteristics of underwater sediments which comprises circular body means for holding a first plurality of concentric electrodes lying in substantially a flat plane on the sediments of an underwater bottom, said body means including means for insulating each of said electrodes from each other and from the body of water overlying said sediments, means for applying an electrical potential between at least one of said electrodes and said body of water, means for detecting changes in potential between another of said electrodes and said body of water due to variations in the electrical impedance of said underwater sediments, a second plurality of concentric electrodes insulated from each other and lying in substantially a flat plane on the sediments of the underwater bottom, said second plurality of electrodes being spaced from each other a multiple of the spacing between the electrodes of said first plurality, means for applying an electrical potential between one of said second plurality of electrodes and said body of water, means for detecting changes in potential between another of said second plurality of electrodes and said body of water due to variations in the electrical impedance of said underwater sediments, means for simultaneously traversing said first and said second plurality of electrodes over the underwater bottom while maintaining a predetermined distance between said first plurality and said second plurality of electrodes, and means for recording said detected changes in potential in accordance with the position of said electrodes on said underwater bottom.

References Cited in the file of this patent

UNITED STATES PATENTS

| | | |
|---|---|---|
| 2,393,009 | Chun | Jan. 15, 1946 |
| 2,669,688 | Doll | Feb. 16, 1954 |
| 2,712,629 | Doll | July 5, 1955 |
| 2,712,630 | Doll | July 5, 1955 |
| 2,712,631 | Ferre | July 5, 1955 |